UNITED STATES PATENT OFFICE.

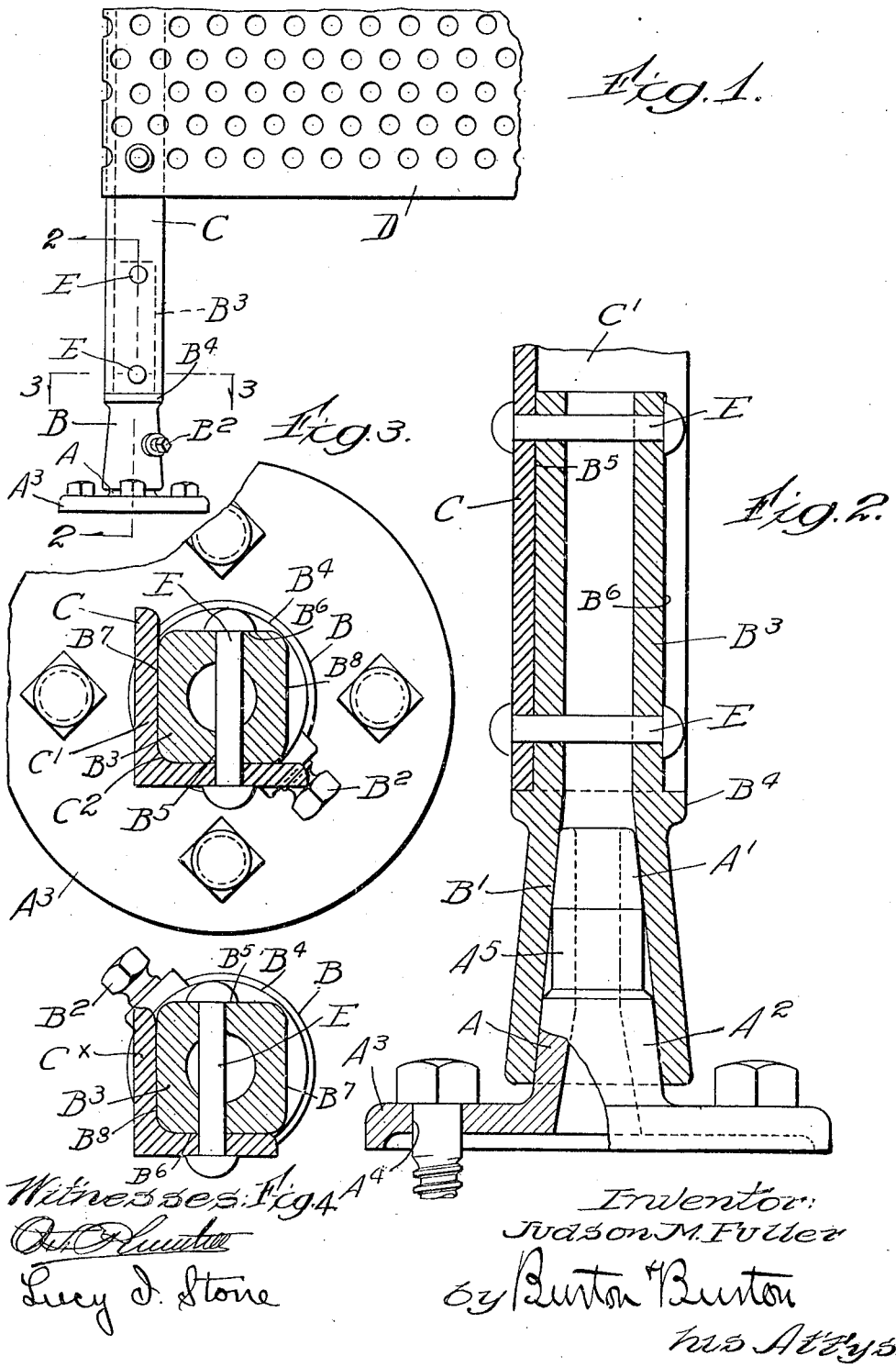

JUDSON M. FULLER, OF CHICAGO, ILLINOIS.

FLOOR-POST AND SOCKET.

1,291,823. Specification of Letters Patent. Patented Jan. 21, 1919.

Application filed October 4, 1915. Serial No. 53,879.

*To all whom it may concern:*

Be it known that I, JUDSON M. FULLER, a citizen of the United States, residing at Chicago, in the county of Cook and State of Illinois, have invented new and useful Improvements in Floor-Posts and Sockets, of which the following is a specification, reference being had to the accompanying drawings, forming a part thereof.

This invention relates to a floor post and socket especially designed for use with machinery guards of perforated metal, but obviously applicable to many other forms of partition which it may be desirable to mount detachably upon the floor. The invention consists in the features and elements and their combinations hereinafter described and shown in the drawings as indicated in the claims.

In the drawings:—

Figure 1 is a side elevation of a floor post and socket embodying this invention and including also a portion of the machinery guard which it is used to support.

Fig. 2 is a vertical section of the floor post and socket taken as indicated at line 2—2 on Fig. 1.

Fig. 3 is a transverse section taken as indicated in line 3—3 on Fig. 1.

Fig. 4 is a section taken similarly to Fig. 3, but showing a different size of angle bar attached to the socket member.

The machinery guards referred to are in the form of screens, fences, or more or less complete housings for such parts as belts and pulleys, fly wheels, large gears, or other moving parts of machines, and the guards are built up of sheets of perforated metal sometimes combined with framing of angle bars, and mounted with a view to reducing or eliminating the danger of accident to operatives employed about the machinery thus safeguarded. In many instances, it is more convenient and preferable to mount such guards or housings directly on the factory floor rather than attach them to the machines themselves, and to permit oiling, repair or adjustment of the parts inclosed it is desirable that the guards be removably mounted.

This is accomplished by the use of the fitting which is the subject of this invention. It comprises a post member, A, and a socket member, B, the post member, A, being tapered at $A^1$ and $A^2$, and having a foot flange, $A^3$, apertured at $A^4$, to receive screws or bolts by which it may be secured to the floor. The member, B, has a downwardly opening tapered socket, $B^1$, formed to fit snugly upon the tapered post of the member, A, and provided with a set screw, $B^2$, whose axis is preferably perpendicular to the axis of the post member, while the latter is formed with a parallel sided or cylindrical portion, $A^5$, intermediate its tapered portions, $A^1$ and $A^2$, and presenting for engagement with the end of the set screw, $B^2$, a surface at right angles to the axis of the screw so that the screw has no tendency to cause longitudinal movement between the post and the socket.

Above the socket, $B^1$, the member, B, comprises a square shank, $B^3$, separated from the socket, $B^1$, by a flange, $B^4$, which serves as a footing for whatever portion of the machinery guard is attached to the shank, $B^3$, which in the present instance is shown as the vertical angle-bar, C, to which, as indicated in Fig. 1, the perforated metal sheet, D, is attached higher up. The bar, C, is secured to the square shank, $B^3$, by bolts or rivets indicated at E. The holes for these rivets, E, are drilled through the faces, $B^5$ and $B^6$, of the square shank, $B^3$, and at such a distance from the face, $B^7$, that when the angle, C, is applied to the shank as indicated in Fig. 3 its flange, $C^1$, will lie flatly against said face, $B^7$, the corners of the square shank being suitably rounded to accommodate the usual fillet of the angle at, $C^2$. The remaining face, $B^8$, of the square shank is at such a distance from the rivet holes that if it is desired to use a smaller angle, as shown at $C^x$, in Fig. 4, this smaller angle may be attached to the apertured face with its flange extending along the face, $B^8$, and in both cases the holes drilled in the angle bars, C or $C^x$, may be positioned according to standard engineering practice.

The fitting as described requires practically no machine work beyond the drilling of the holes in the shank, $B^3$, and the drilling and tapping of the holes for the set screw, $B^2$; it is found that the post and socket, by virtue of their tapered form, will fit with satisfactory snugness just as they come from the foundry. The set screw, $B^2$, however, will prevent them from working loose through vibration of the floor or surrounding parts.

I claim:—

1. A disengageable support comprising a tapered post having a foot flange adapted for attachment to the floor, and a member formed interiorly with a downwardly opening tapered socket adapted to fit the post, and exteriorly with a flat vertical wall adapted for attachment to the part to be supported.

2. A disengageable support comprising a tapered post having a foot flange apertured to receive securing means, and a member formed interiorly with a downwardly opening tapered socket adapted to fit the post, and exteriorly with a vertically extending shank of rectangular cross section apertured to receive means for attaching the part to be supported.

3. A disengageable support comprising a post having a foot flange adapted to be secured to the floor, and a member formed interiorly with a downwardly opening socket adapted to fit said post, and exteriorly with a flat vertical wall adapted for attachment to the part to be supported, said tapered post and socket being circular in cross section, and a set screw carried by the socket member in position to engage the side of the post.

4. A disengageable support comprising a tapered post having a foot flange adapted to be secured to the floor, and a member formed interiorly with a downwardly opening tapered socket adapted to fit said post, and having a shank with a flat vertical wall adapted for attachment to the part to be supported, said tapered post and socket being circular in cross section, a set screw carried by the socket member with its axis at right angles to the axis of the socket, said post having a cylindrical section positioned to register with said set screw when the post and socket are engaged.

5. A disengageable support comprising a post having a foot flange adapted to be secured to the floor, and a member comprising a downwardly opening socket adapted to fit said post, and having a shank of rectangular cross section designed for attachment to the part to be supported, together with a set screw carried by the socket member in position to engage the side of the post and extending transversely from said socket in a diagonal direction with respect to the rectangular shank of said member.

In testimony whereof I have hereunto set my hand at Chicago, Illinois, this 1st day of October, 1915.

JUDSON M. FULLER.